US009981735B2

(12) United States Patent
Reusch

(10) Patent No.: US 9,981,735 B2
(45) Date of Patent: May 29, 2018

(54) STRUCTURAL ARRANGEMENT AND METHOD OF FABRICATING A COMPOSITE TRAILING EDGE CONTROL SURFACE

(71) Applicant: The Boeing Company, Chicago, IL (US)

(72) Inventor: David C. Reusch, Seattle, WA (US)

(73) Assignee: The Boeing Company, Chicago, IL (US)

( * ) Notice: Subject to any disclaimer, the term of this patent is extended or adjusted under 35 U.S.C. 154(b) by 795 days.

(21) Appl. No.: 14/231,975

(22) Filed: Apr. 1, 2014

(65) Prior Publication Data

US 2016/0137287 A1    May 19, 2016

(51) Int. Cl.
| | |
|---|---|
| *B64C 5/06* | (2006.01) |
| *B64C 9/00* | (2006.01) |
| *B29C 70/30* | (2006.01) |
| *B64C 3/20* | (2006.01) |
| *B64C 9/02* | (2006.01) |
| *B64C 9/12* | (2006.01) |
| *B64F 5/10* | (2017.01) |

(52) U.S. Cl.
CPC ............... *B64C 9/00* (2013.01); *B29C 70/30* (2013.01); *B64C 3/20* (2013.01); *B64C 9/02* (2013.01);
(Continued)

(58) Field of Classification Search
CPC .......... B64C 3/18; B64C 3/182; B64C 3/185; B64C 3/187; Y10T 156/1051
(Continued)

(56) References Cited

U.S. PATENT DOCUMENTS

2003/0192990 A1* 10/2003 Simpson ............. B29C 37/0064
                                                              244/123.7
2004/0145080 A1   7/2004 Tanaka
(Continued)

FOREIGN PATENT DOCUMENTS

| EP | 0532016 A1 | 3/1993 |
| WO | 2013005206 A1 | 1/2013 |

OTHER PUBLICATIONS

International Search Report related to Application No. PCT/US2015/010967; dated Oct. 9, 2015.
(Continued)

*Primary Examiner* — Scott W Dodds
(74) *Attorney, Agent, or Firm* — Miller, Matthias & Hull LLP

(57) ABSTRACT

The present disclosure is generally directed to a composite trailing edge control surface including a contiguous one-piece composite control surface skin wrapped around a plurality of stiffening cores, a plurality of hinge fittings, and a plurality of substantially parallel ribs. The contiguous one-piece composite control surface skin provides a control surface on opposing sides of the trailing edge control surface and substantially distributes bending, shear and torsion loads of the trailing edge control surface to the plurality of hinge fittings and the plurality of substantially parallel ribs. A method of manufacturing the trailing edge control surface includes positioning a contiguous one-piece composite control surface skin on a substantially flat tool. A plurality of stiffener cores having a plurality of thin covering skins are positioned on the contiguous one-piece composite control surface skin and are cured to create a laminate sandwich composite structure skin that is trimmed and has fastener apertures and hinge fitting access apertures provided therethrough.

20 Claims, 9 Drawing Sheets

(52) U.S. Cl.
CPC .................. *B64C 9/12* (2013.01); *B64F 5/10* (2017.01); *B29C 2793/0081* (2013.01); *B64C 2009/005* (2013.01); *Y02T 50/433* (2013.01)

(58) Field of Classification Search
USPC ......................................................... 156/226
See application file for complete search history.

(56) References Cited

U.S. PATENT DOCUMENTS

| | | | |
|---|---|---|---|
| 2008/0111024 A1* | 5/2008 | Lee .......................... | B64C 1/068 244/121 |
| 2010/0247838 A1 | 9/2010 | Burpo et al. | |
| 2012/0061515 A1* | 3/2012 | Remene .................. | B29C 70/30 244/123.1 |

OTHER PUBLICATIONS

International Preliminary Report on Patentability related to Application No. PCT/US2015/010967; dated Oct. 13, 2016.

\* cited by examiner

STRUCTURAL ARRANGEMENT AND METHOD OF FABRICATING A COMPOSITE TRAILING EDGE CONTROL SURFACE

TECHNICAL FIELD

The field of the embodiments presented herein is directed toward a composite trailing edge control surface for use in air vehicles and a method for fabricating the composite trailing edge control surface.

BACKGROUND

FIG. 1 illustrates an aircraft 10 having various trailing edge surfaces. Trailing edge control surfaces redirect the air flow from a leading edge 20 of an aerodynamic surface, for example, a leading edge of a vertical stabilizer 30, to a rear trailing edge of a control surface 40, which creates a pressure differential or controlling force that rotates the aircraft 10 about an applicable axis of rotation. Control surfaces may include ailerons 50 on the trailing edge of the wings 60 for controlling roll of the aircraft 10, elevators 70 on the trailing edge of the horizontal stabilizers of the aircraft 10 for controlling pitch of the aircraft 10, and a rudder 80 on the rear trailing edge of the control surface 40 of the vertical stabilizer 30 for controlling yaw of the aircraft 10.

In a conventional trailing edge control surface, the main bending, shear and torsional loads exerted on the control surface structure are carried by a longitudinal spar 82. For example, in FIG. 1, a view of the internal structure of the vertical control surface rudder 80 is illustrated containing a spar 82 longitudinally extending a substantial portion of the length of the rudder 80 and supported by multiple ribs 84. The spar 82 typically projects in a direction substantially perpendicular from the primary axis of the aircraft 10 and supports bending, shear and torsion loads on the rudder 80 in flight.

Trailing edge control surfaces have been traditionally fabricated from a number of machined parts where fastener holes that join internal parts and sub-assemblies to the control surface skin are typically drilled after the control surface has been temporarily assembled. Drilling fastener holes into assembled control surfaces requires a number of sophisticated and complex jigs that are custom fabricated for the control surface prior to the first assembly.

There is a need to reduce the cost and manufacturing resources required to build and maintain the assembly jigs used to build the control surfaces in favor of simpler, more cost effective and flexible systems. It is with respect to these and other considerations that the disclosure herein is presented.

SUMMARY

It should be appreciated that this Summary is provided to introduce a selection of concepts in a simplified form that are further described below in the Detailed Description. This Summary is not intended to be used to limit the scope of the claimed subject matter.

In one embodiment disclosed herein, a composite trailing edge control surface includes a contiguous one-piece composite control surface skin (usually a laminate including a number of stiffening cores), a number of hinge fittings, and a number of substantially parallel ribs. The contiguous one-piece composite control surface skin is enclosed around the plurality of stiffening cores, and wrapped around the plurality of hinge fittings and the plurality of substantially parallel ribs to provide a control surface on opposing sides of the trailing edge control surface and substantially distribute bending, shear and torsion loads of trailing edge control surface to the plurality of hinge fittings and the plurality of substantially parallel ribs In another embodiment disclosed herein, a method of manufacturing a trailing edge control surface includes laminating a contiguous one-piece composite control surface skin on a substantially flat tool, positioning a number of stiffener cores on the control surface skin and laminating a corresponding number of thin covering skins over each of the number of stiffener cores. The contiguous one-piece composite control surface skin, the number of stiffener cores and the corresponding number of thin covering skins may be cured to create a laminate sandwich composite structure skin. The laminate sandwich composite structure skin may be trimmed, and fastener apertures and hinge fitting access apertures may be provided through the laminate sandwich composite structure skin.

In another embodiment disclosed herein, a method of manufacturing a trailing edge control surface includes positioning a contiguous one-piece composite control surface skin on a substantially flat tool and providing fastener apertures and hinge fitting access apertures through the control surface skin. A number of stiffener cores and a corresponding number of thin covering skins over each of the number of stiffener cores may be provided on the control surface skin between sections of fastener apertures. The contiguous one-piece composite control surface skin, the number of stiffener cores and the corresponding number of thin covering skins may be cured to create a laminate sandwich composite structure skin. Thereafter, the laminate sandwich composite structure skin may be removed from the substantially flat tool, and the laminate sandwich composite structure skin may be folded to envelope a number of ribs and a number of hinge fittings. Traditionally, a pair of skins would be attached to these same ribs and fittings but would also require a longitudinal spar. By wrapping the single skin around the respective internal part the need for a longitudinal spar is eliminated. The laminate sandwich composite structure skin may be partially jointed to the number of ribs and the number of hinge fittings, and number of hinge fittings may be aligned. The laminate sandwich composite structure skin may then be permanently joined to the number of ribs and the number of hinge fittings.

The features, functions, and advantages that have been discussed can be achieved independently in various embodiments of the present disclosure or may be combined in yet other embodiments, further details of which can be seen with reference to the following description and drawings.

BRIEF DESCRIPTION OF THE DRAWINGS

The embodiments presented herein will become more fully understood from the detailed description and the accompanying drawings, wherein.

DETAILED DESCRIPTION

The following detailed description is directed to methods of fabricating a trailing edge control surface and the assembled trailing edge control surface created by those methods.

Figure 2:
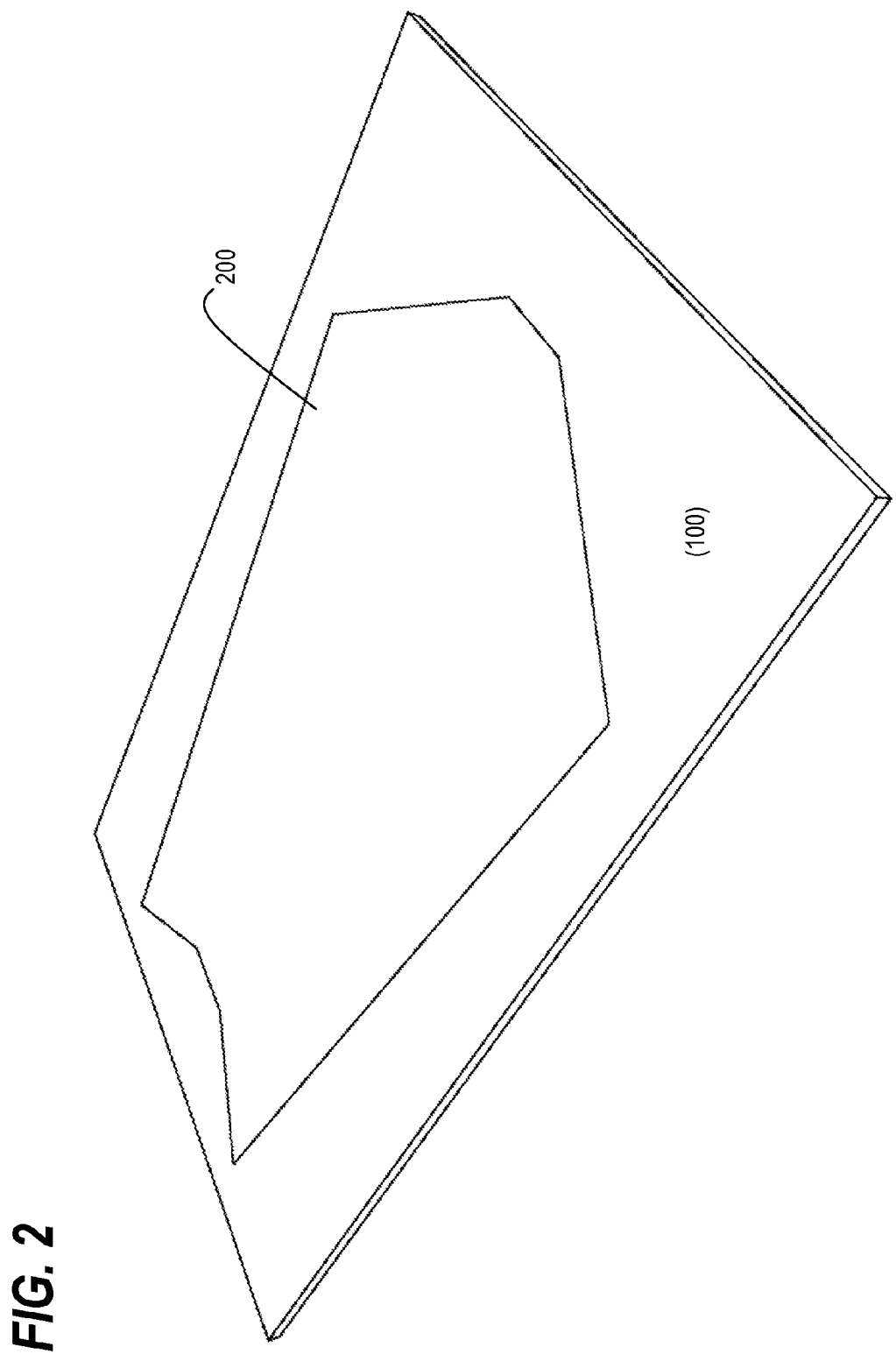
FIG. 2 illustrates one embodiment of providing a contiguous one-piece composite control surface skin on a substantially flat tool according to at least one embodiment disclosed herein.

FIG. 2 illustrates one embodiment of providing a contiguous one-piece composite control surface skin 200 on a substantially flat tool 100 that requires no contour features. The substantially flat tool 100 so configured could be shared to make other production parts on its surface. The control surface skin 200 may include a solid laminate made from of a number of plies of carbon fiber material regions of skin over core creating a sandwich structure and may also have regions with no core. The control surface skin 200 may be in an un-cut blank form (not shown), or in a rough trimmed or finally trimmed configuration as shown in FIG. 2.

Figure 3:
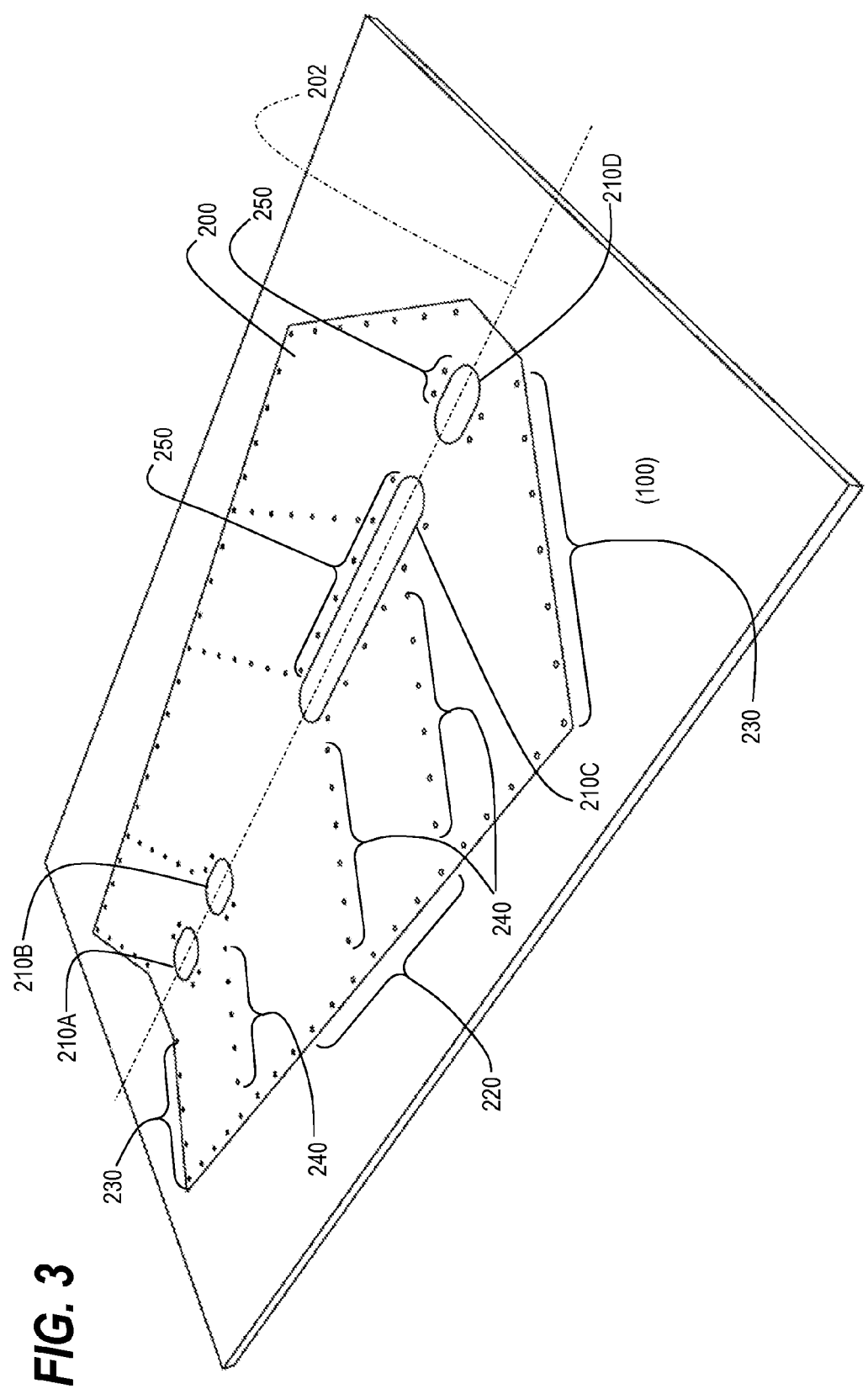
FIG. 3 illustrates one embodiment of the contiguous one-piece composite control surface skin receiving a number of fastener and access apertures there-through according to at least one embodiment disclosed herein.

FIG. 3 illustrates one embodiment of the contiguous one-piece composite control surface skin 200 receiving a number of fastener and access apertures there-through. While the control surface skin 200 lies on the flat tool 100, any number of apertures used for fasteners or access may be cut therein. A computer numerical control (CNC) cutting system or equivalent may be used to quickly and precisely cut these apertures in the control surface skin 200. For example, an upper access aperture 210A, an upper-middle access aperture 210B, a middle access aperture 210C and a lower access aperture 210D may be cut out from the control surface skin 200 along the line of symmetry 202 of the control surface skin 200. These access apertures 210A-210D allow access to hinge fittings after the control surface skin is wrapped around itself to produce the final assembled form of the trailing edge control surface.

Trailing edge fastener apertures 220 may be made along both the sides of the control surface skin 200 at a trailing edge. These trailing edge fastener apertures 220 will be fastened to each other when the control surface skin 200 is folded along the line of symmetry 202 and then fastened together. Upper and lower rib fastener apertures 230 may be made along the upper and lower edges of the control surface skin 200 to be fastened to corresponding rib structures at the upper and lower respective ends of the control surface skin (shown in FIGS. 5-6). Internal rib fastener apertures 240 may be positioned symmetrically along the line of symmetry 202 of the control surface skin 200 to be fastened to corresponding rib structures within the control surface skin 200 when folded along the line of symmetry 202. Access opening fastener apertures 250 may be positioned around the access apertures 210A-210D opposite the line of symmetry 202 of the control surface skin 200 to fasten hinge fittings and adjoining ribs to the control surface skin 200.

Figure 4:
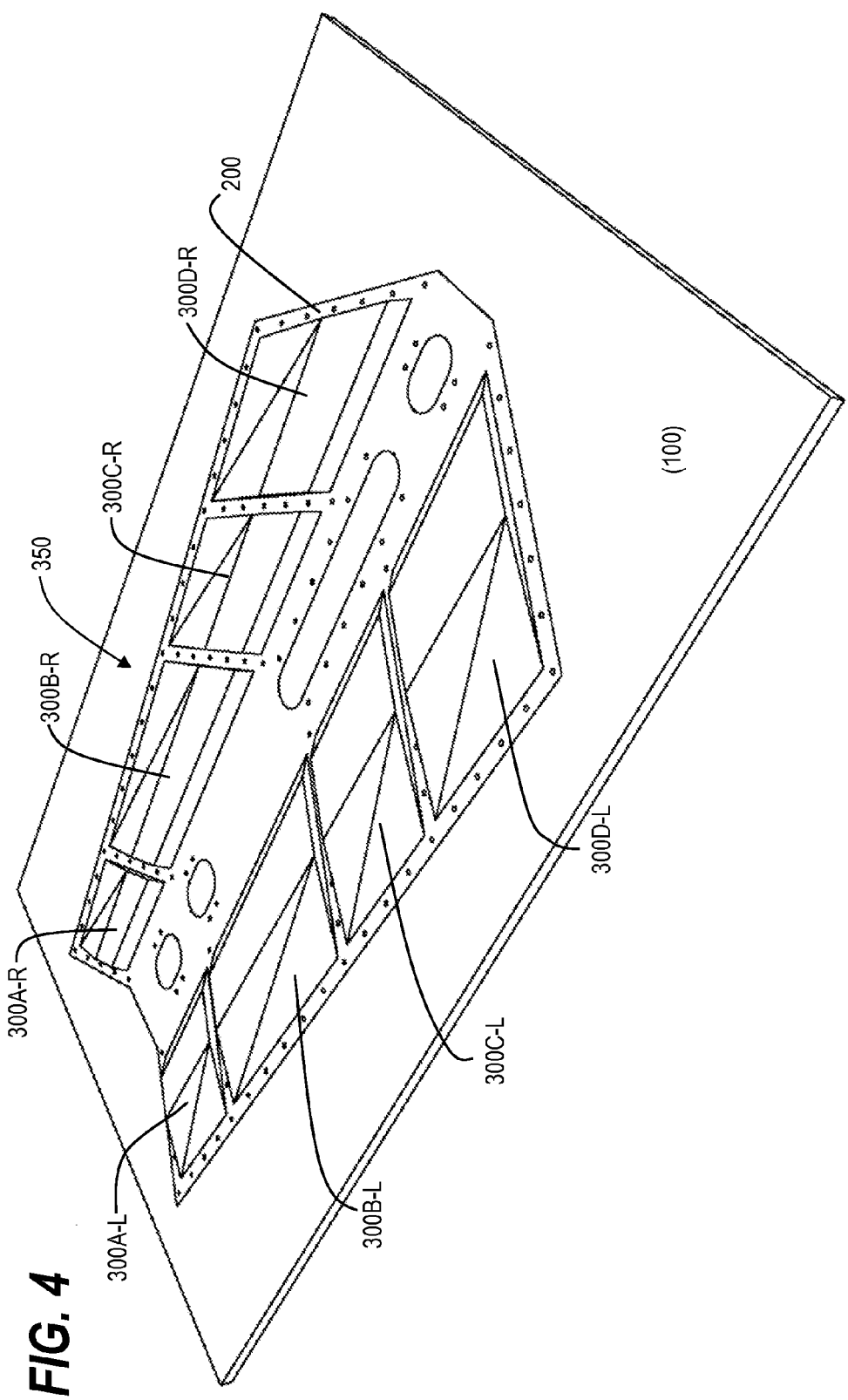
FIG. 4 illustrates one embodiment of the contiguous one-piece composite control surface skin receiving a number of stiffening cores according to at least one embodiment disclosed herein.

FIG. 4 illustrates one embodiment of the contiguous one-piece composite control surface skin 200 receiving a number of stiffening cores. Honeycomb stiffening cores 300 (generally) may be disposed between the trailing edge fastener apertures 220, the upper and lower rib fastener apertures 230, the internal rib fastener apertures 240, and the access opening fastener apertures 250. These honeycomb stiffening cores 300 may be oriented so that the honeycomb structure is oriented normal to the surface of the control surface skin 200. The honeycomb stiffening core may also include a thin skin of carbon fiber material bonded thereto to create a sandwich structure. to reinforce the control surface skin 200 against loads acting thereupon (e.g. lateral loads). For example, an upper left honeycomb stiffening core 300A-L may be disposed opposite the line of symmetry 202 from an upper right honeycomb stiffening core 300A-R; an upper-middle left honeycomb stiffening core 300B-L may be disposed opposite the line of symmetry 202 from an upper-middle right honeycomb stiffening core 300B-R; a middle left honeycomb stiffening core 300C-L may be disposed opposite the line of symmetry 202 from a middle right honeycomb stiffening core 300C-R; and a lower left honeycomb stiffening core 300D-L may be disposed opposite the line of symmetry 202 from a lower right honeycomb stiffening core 300D-R.

Figure 5:
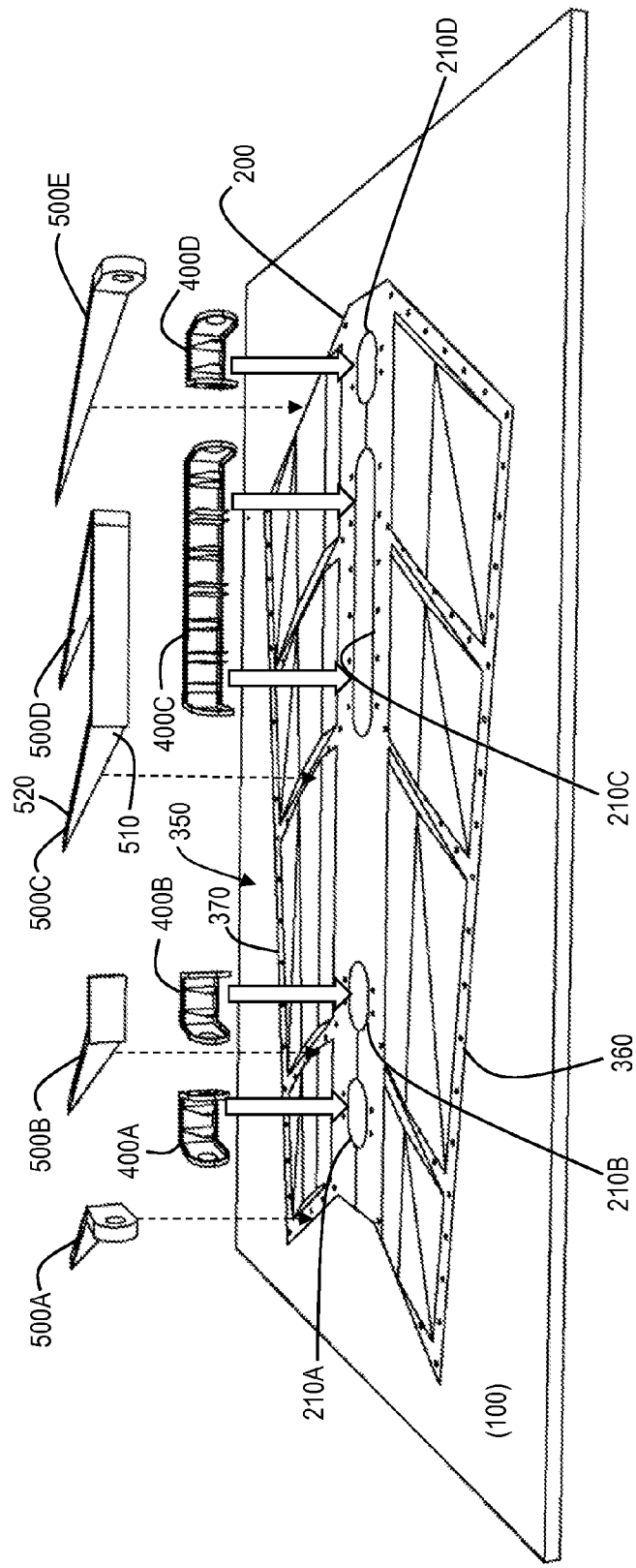
FIG. 5 illustrates one embodiment of the contiguous one-piece composite control surface skin receiving a number of hinge fittings and a number of substantially parallel ribs according to at least one embodiment disclosed herein.

FIG. 5 illustrates one embodiment of the contiguous one-piece composite control surface skin receiving a number of hinge fittings 400A-400D and a number of substantially parallel ribs 500A-500E. Each hinge fitting 400A-400D comprises a number of fitting hardware mounted to a longitudinal support structure. The hinge fittings 400A-400D may be each disposed proximate the respective access apertures 210A-210D and may be connected to the control surface skin 200 via access opening fastener apertures 250 as illustrated in FIG. 3. For example, the upper hinge fitting 400A may be disposed proximate the upper access aperture 210A; the upper-middle hinge fitting 400B may be disposed proximate the upper-middle access aperture 210B; middle hinge fitting 400C may be disposed proximate the middle access aperture 210C; and, the lower hinge fitting 400D may be disposed proximate the lower access aperture 210D.

Each of the ribs 500A-500E includes a tapered section that tapers to the trailing edge of the control surface skin 200. The ribs 500A-500E may be each disposed proximate the respective upper and lower rib fastener apertures 230, as illustrated in FIG. 3, and internal rib fastener apertures 240 wherein they may be connected to the control surface skin 200. For example, the upper rib 500A and the lower rib 500E may be connected to the control surface skin 200 via the upper and lower rib fastener apertures 230, and the upper-middle rib 500B, the first middle rib 500C and the second middle rib 500D may be connected to control surface skin 200 via the internal rib fastener apertures 240.

Figure 6:
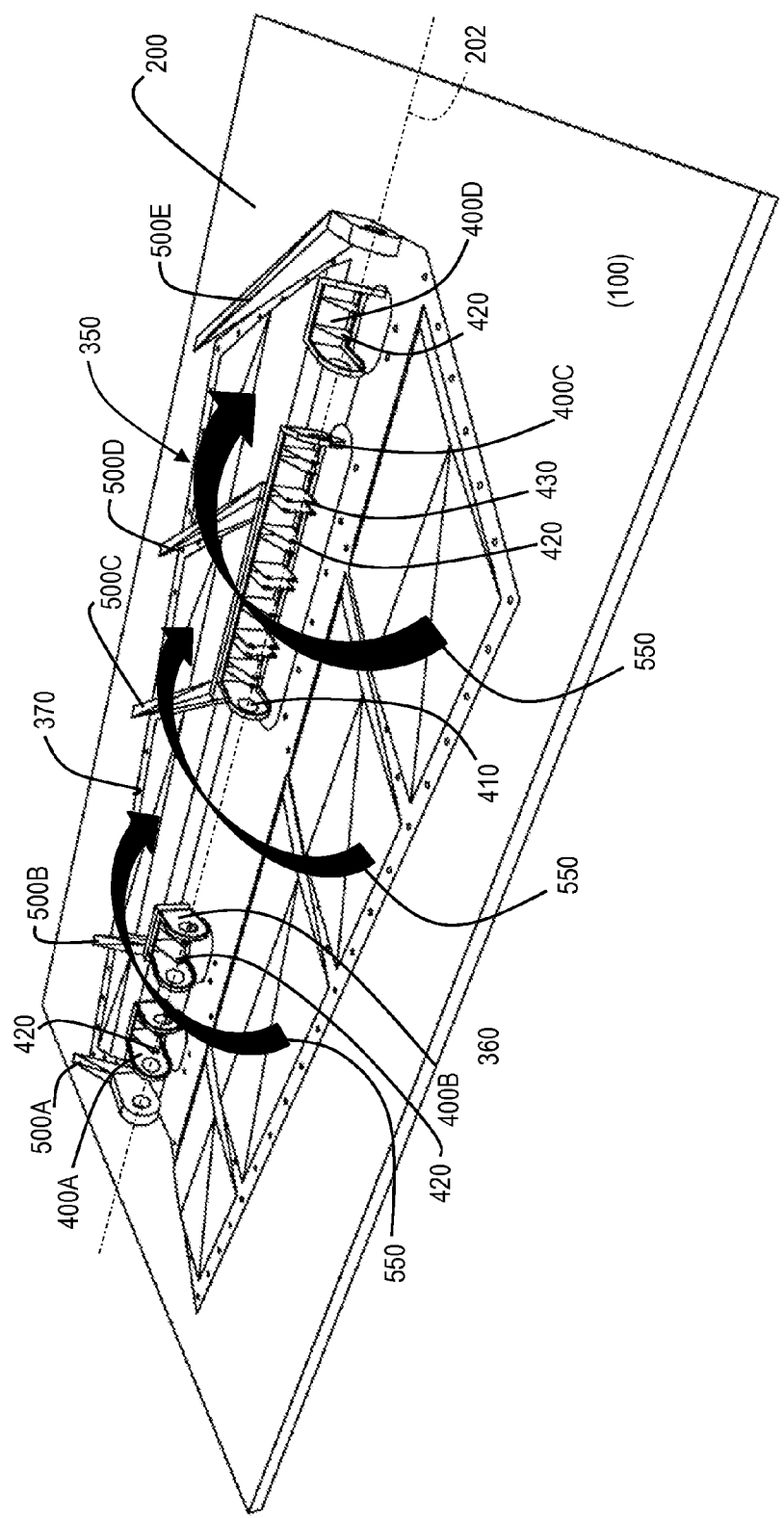
FIG. 6 illustrates one embodiment of the contiguous one-piece composite control surface skin and the number of stiffening cores being folded upon itself according to at least one embodiment disclosed herein.

FIG. 6 illustrates one embodiment of the contiguous one-piece composite control surface skin 200 and the number of stiffening cores 300 (generally) being folded upon itself along the line of symmetry 202 of the control surface skin 200. FIG. 6 additionally illustrates that at least one hinge fitting, for example, 400C of the number of hinge fittings may be connected to a first end of one of the number of ribs, for example 500C and 500D, and likewise upper-middle hinge fitting 400B connected to upper-middle rib 500B. In another exemplary instance, hinge fittings 400A and 400D may not be connected to any of the number of ribs 500A-500E and may be structurally supported on the control surface skin 200 by fasteners through their respective access opening fastener apertures 250. FIG. 6 additionally illustrates in hinge fittings 400A-400D, an access hole 410, (see upper end of middle hinge fitting 400C, although access holes 410 may be in each distal end of the hinge fittings 400A-400D), a number of hinge bores 420, and an actuator fitting bore 430 (shown in middle hinge fitting 400C).

Figure 7:
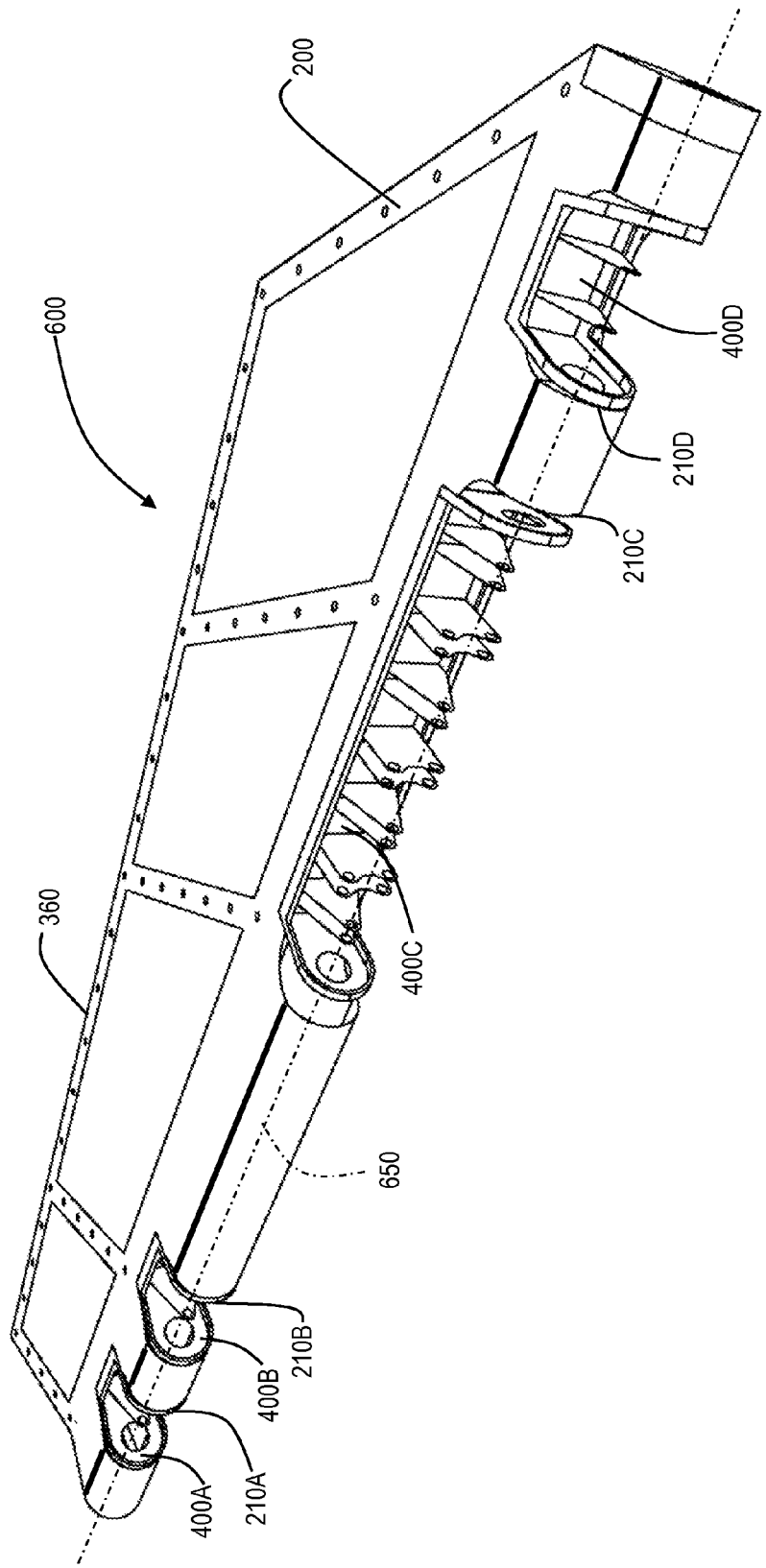
FIG. 7 illustrates one embodiment of the assembled trailing edge control surface according to at least one embodiment disclosed herein.

FIG. 7 illustrates one embodiment of the assembled composite trailing edge control surface 600 having the control surface skin being wrapped around the ribs 500A-500E (as shown in FIGS. 5-6), and having the hinge fittings 400A-400D visible through the respective access apertures 210A-210D. A centerline of rotation 650 passes through receiving elements on the hinge fittings 400A-400D to receive corresponding actuation control hardware from the aircraft control system to rotate the assembled composite trailing edge control surface 600 about the centerline of rotation 650.

In summary, a composite trailing edge control surface 600 may include a contiguous one-piece composite control surface skin 200, a number of stiffening cores 300A-300D, a number of hinge fittings 400A-400D, and a number of substantially parallel ribs 500A-500E. The control surface skin 200 may include a solid laminate of a number of plies of carbon fiber material, and may include a number of access apertures 210A-210D that provide access through the control surface skin 200 to the number of hinge fittings 400A-400D. At least one hinge fitting, for example 400B, of the number of hinge fittings 400A-400D may be connected to a first end of one of the number of ribs 500A-500E, for example 500B. The number of stiffening cores 300A-300D comprises honeycomb stiffening cores laminated with a thin covering skin of carbon fiber material and may be disposed between each of the number of ribs 500A-500E on the control surface skin 200. The control surface skin 200 may be curved at a first end and joined to itself at a second end, and a centerline of rotation 650 of the composite trailing edge control surface may be located at the first end and through each of the number of hinge fittings 400A-400D.

Figure 8:
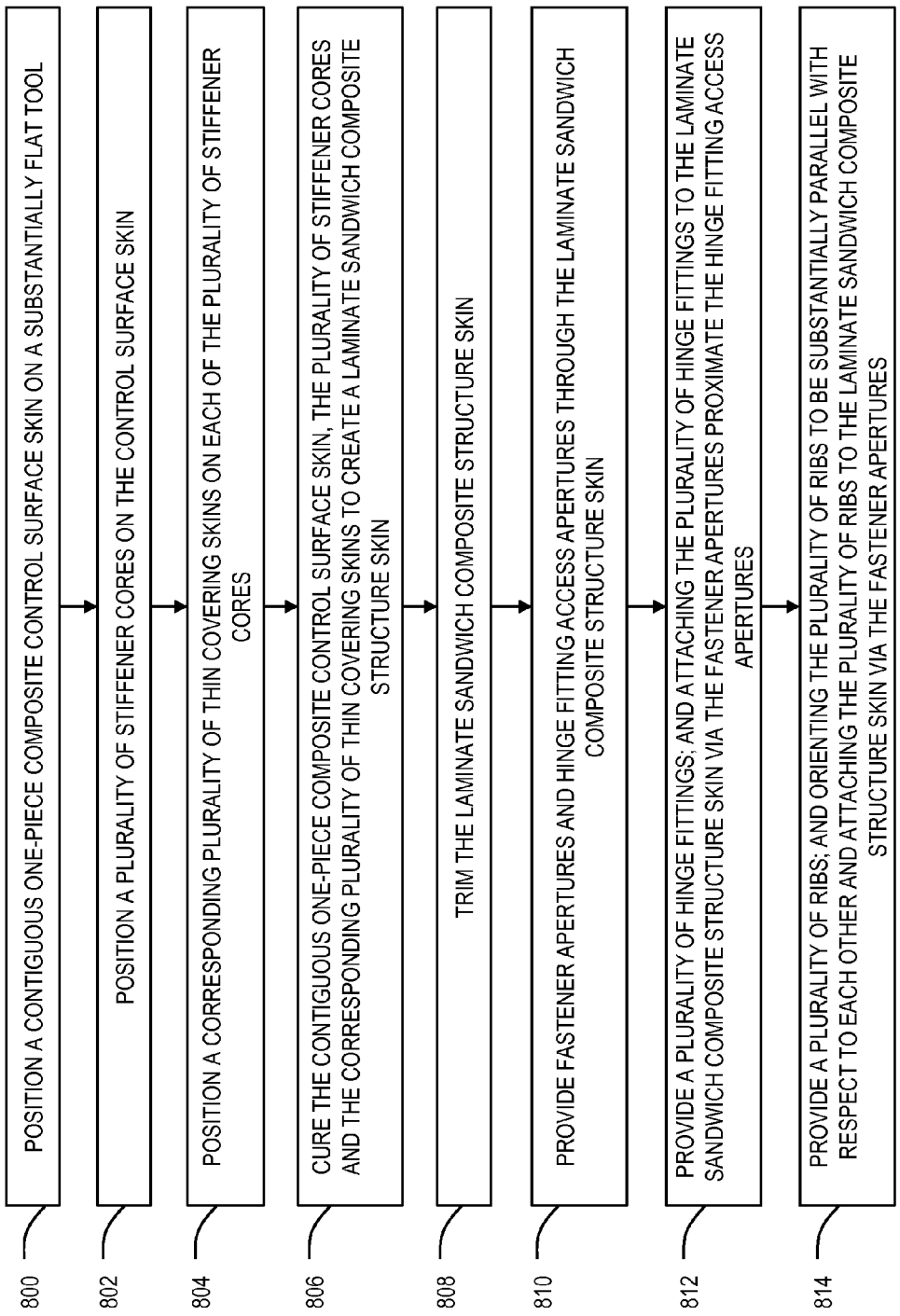
FIG. 8 illustrates one embodiment of a first method of fabricating a trailing edge control surface according to at least one embodiment disclosed herein.

FIG. 8 illustrates one embodiment of a first method of fabricating a trailing edge control surface including positioning 800 a contiguous one-piece composite control surface skin 200 on a substantially flat tool, positioning 802 a number of stiffener cores 300A-300D on the control surface skin 200, positioning 804 a corresponding number of thin covering skins on each of the number of stiffener cores 300A-300D, and curing 806 the contiguous one-piece composite control surface skin 200, the number of stiffener cores 300A-300D and the corresponding number of thin covering skins to create a laminate sandwich composite structure skin 350. The laminate sandwich composite structure skin 350 may be trimmed 808, and fastener apertures 220-250 and hinge fitting access apertures 210A-210D may be provided 810 through the laminate sandwich composite structure skin 350.

A number of hinge fittings 400A-400D may be provided 812 where the number of hinge fittings may be attached to the laminate sandwich composite structure skin 350 via the fastener apertures 220-250 proximate the hinge fitting access apertures 210A-210D. A number of ribs 500A-500E may be provided 814 that may be oriented substantially parallel with respect to each other and attaching the number of ribs 500A-500E to the laminate sandwich composite structure skin 350 via the fastener apertures 220-250.

At least one of the number of hinge fittings 400A-400D may be fastened to a first end 510 of at least one of the number of ribs 500A-500E. The first end 510 may be opposite a distal end 520 of the at least one of the number of ribs 500A-500E. A first end 360 of the laminate sandwich composite structure skin 350 may be wrapped or folded onto a second end 370 of the laminate sandwich composite structure skin 350, and the first end 360 may be glued with any suitable adhesive, (e.g., a strip film adhesive which is cut from a roll or a liquid adhesive that is applied with a caulking gun), to the second end 370 of the laminate sandwich composite structure skin 350. Liquid adhesives used to glue the first 360 and second 370 ends may be mixed from two parts and are frequently cured at room temperature. A film adhesive may be utilized that is applied from a roll and may be stored in a freezer until it is applied. These adhesives may be cured with a heat source such as heat blanket or in an oven. The first end 360 may be fastened to the second end 370 of the laminate sandwich composite structure skin 350.

Figure 9:
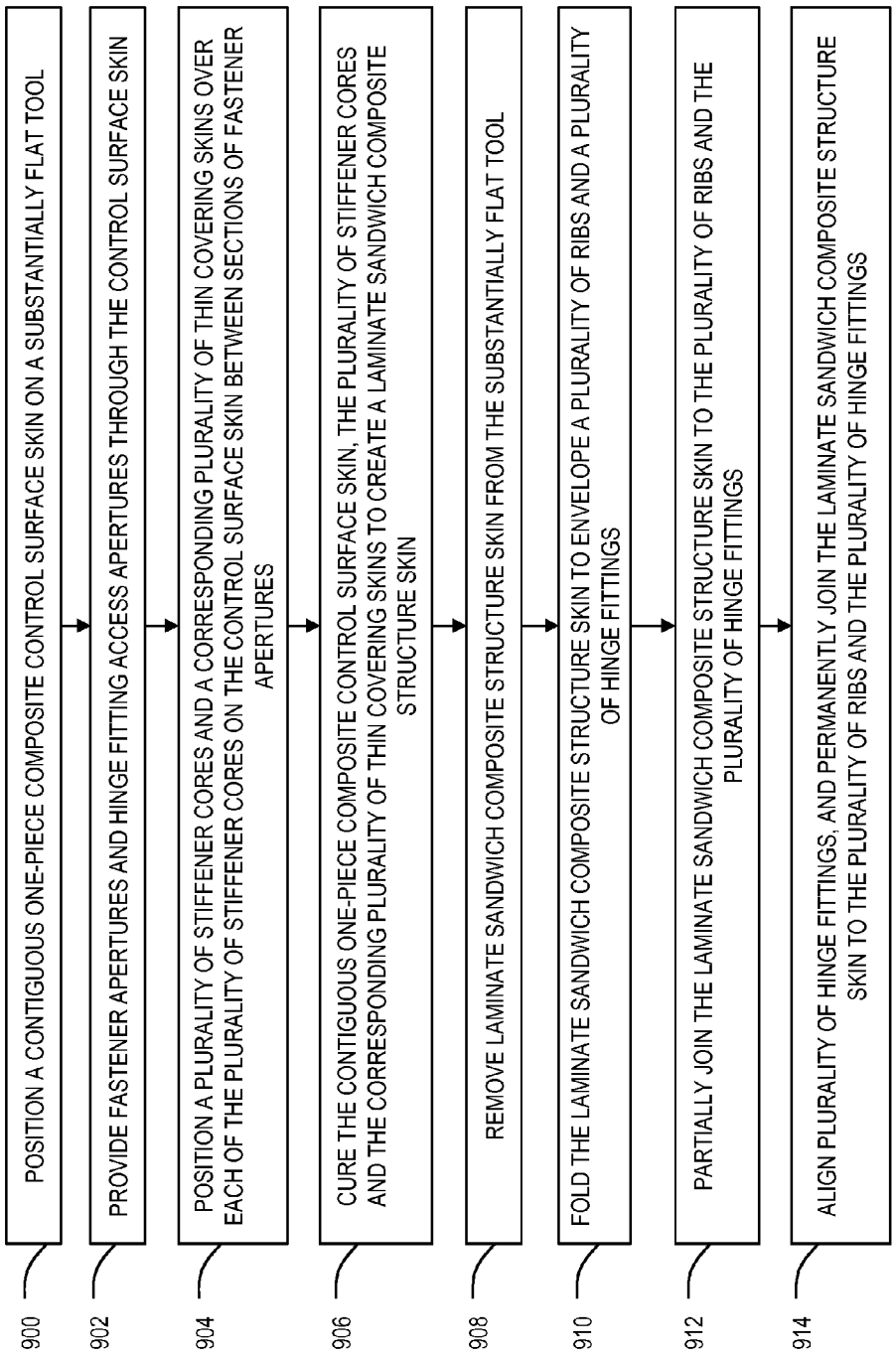
FIG. 9 illustrates one embodiment of a second method of fabricating a trailing edge control surface according to at least one embodiment disclosed herein.

FIG. 9 illustrates one embodiment of a second method of fabricating a trailing edge control surface including positioning 900 a contiguous one-piece composite control surface skin 200 on a substantially flat tool 100, providing 902 fastener apertures 220-250 and hinge fitting access apertures 210A-210D through the control surface skin 200, positioning 904 a number of stiffener cores 300A-300D and a corresponding number of thin covering skins over each of the number of stiffener cores 300A-300D on the control surface skin 200 between sections of fastener apertures 220-250, and thereafter, curing 906 the contiguous one-piece composite control surface skin 200, the number of stiffener cores 300A-300D and the corresponding number of thin covering skins to create a laminate sandwich composite structure skin 350.

The laminate sandwich composite structure skin 350 may be removed 908 from the substantially flat tool 100, and the laminate sandwich composite structure skin 350 may be folded 910 to envelope a number of ribs 500A-500E and a number of hinge fittings 400A-400D. After folding, the laminate sandwich composite structure skin 350 may be partially joined 912 to the number of ribs 500A-500E and the number of hinge fittings 400A-400D. The number of hinge fittings 400A-400D may then be aligned 914, and the laminate sandwich composite structure skin 350 may then be permanently joined to the number of ribs 500A-500E and the number of hinge fittings 400A-400D.

Partially joining the laminate sandwich composite structure skin 350 to the number of ribs 500A-500E and the number of hinge fittings 400A-400D may further include applying any suitable type of sealant, (e.g., usually a viscous liquid sealant mixed from two parts typically cured at room temperature, such as polysulfone), to all adjoining interfaces of the laminate sandwich composite structure skin 350 with the number of ribs 500A-500E and the number of hinge fittings 400A-400D.

Folding the laminate sandwich composite structure skin 350 may further include providing a curved portion of the laminate sandwich composite structure skin 350 at a first end 360 of the composite trailing edge control surface 600, and a joined portion of the laminate sandwich composite structure skin 350 at a second end 370 of the composite trailing edge control surface 600, the joined portion having two oppositely disposed edges of the laminate sandwich composite structure skin 350 joined to themselves.

Aligning the number of hinge fittings 400A-400D may further include providing a centerline of rotation 650 of the composite trailing edge control surface 600 being located at the first end 360 and through each of the number of hinge fittings 400A-400D.

The method of manufacturing a trailing edge control surface may further include providing a number of access apertures 210A-210D in the laminate sandwich composite structure skin 350 that provide access through the control surface skin 200 to the number of hinge fittings 400A-400D.

Permanently joining the laminate sandwich composite structure skin 350 to the number of ribs 500A-500E and the number of hinge fittings 400A-400D may further include providing mechanical fasteners through the number of fastener apertures 220-250 of the laminate sandwich composite structure skin 350 into the number of ribs 500A-500E and the number of hinge fittings 400A-400D.

The above presented embodiments enable pre-drilling of fastening holes into the monolithic composite control surface skin before it is assembled with its respective internal parts and sub-assemblies, e.g., the hinge fittings and ribs, which provides a simpler, more cost effective and flexible system of fabricating trailing edge control surfaces thereby eliminating the cost and manufacturing resources required to build and maintain fastening hole drilling jigs used on finally assembled control surfaces.

Figure 1:
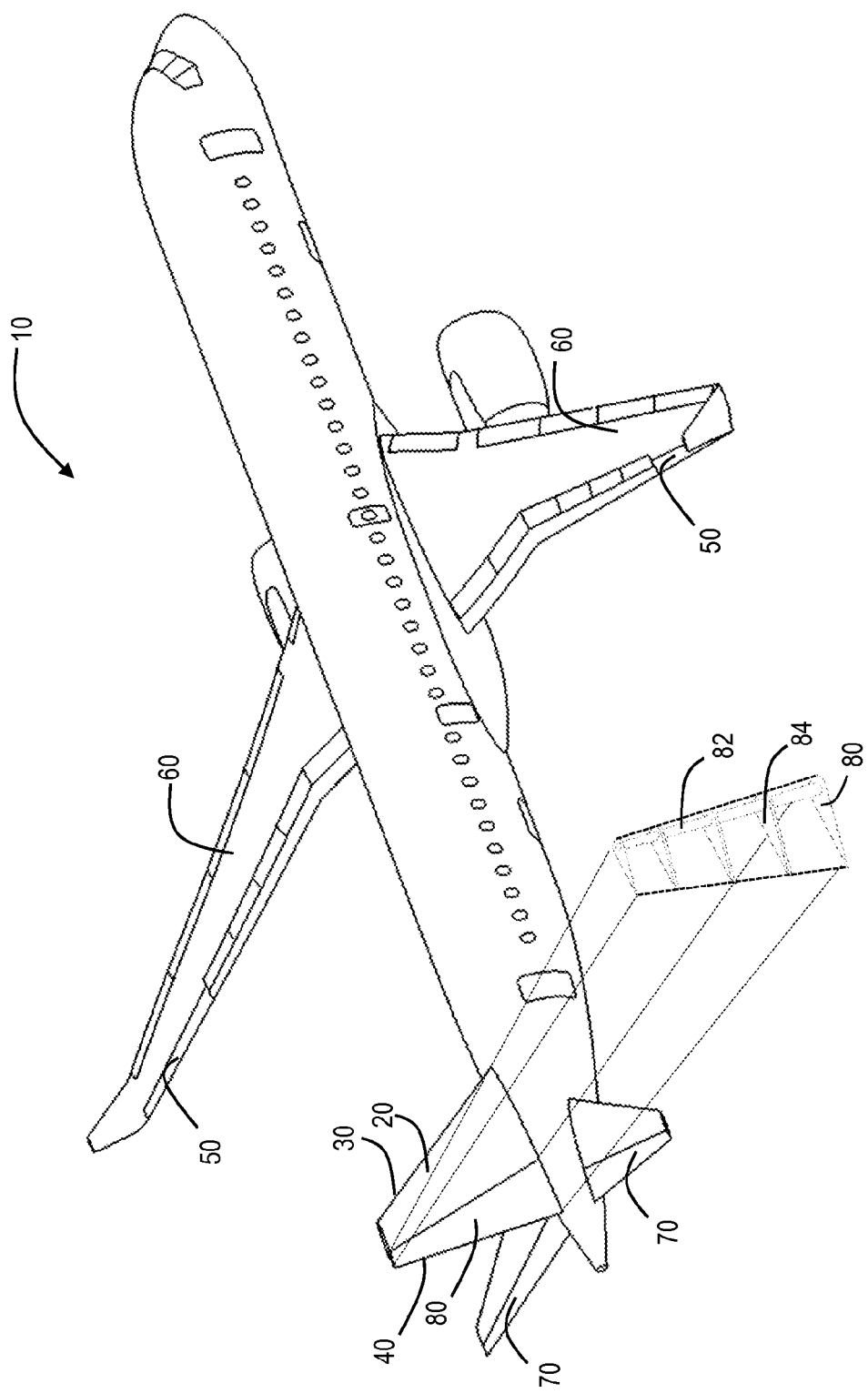
FIG. 1 illustrates an aircraft that demonstrates the context and application of the embodiments disclosed herein directed to a trailing edge control surface.

The above presented embodiments also eliminate the need for a spar element conventionally enclosed between two skins of a control surface, for example, as typically configured at element 82 in the illustration of FIG. 1. Since the monolithic composite control surface skin 200 is wrapped around the internal hinge fittings 400A-400D and ribs 500A-500E, the control surface skin 200 forms a closed torsion cell that substantially carries all the bending, shear and torsion loads traditionally carried by a spar element, for example spar 82 conventionally internally configured within a horizontal or vertical control surface.

The subject matter described above is provided by way of illustration only and should not be construed as limiting. Various modifications and changes may be made to the subject matter described herein without following the example embodiments and applications illustrated and described, and without departing from the true spirit and scope of the present disclosure, which is set forth in the following claims.

The invention claimed is:

1. A method of manufacturing a trailing edge control surface comprising:
   positioning a contiguous one-piece composite control surface skin on a substantially flat tool;
   positioning a plurality of stiffener cores on the contiguous one-piece composite control surface skin;
   positioning a corresponding plurality of thin covering skins on each of the plurality of stiffener cores to create a laminate sandwich composite structure;
   providing fastener apertures and hinge fitting access apertures through the laminate sandwich composite structure;
   attaching a plurality of hinge fittings to the laminate sandwich composite structure via the fastener apertures proximate the hinge fitting access apertures;
   orienting a plurality of ribs to be substantially parallel with respect to each other and attaching the plurality of ribs to the laminate sandwich composite structure via the fastener apertures;
   then wrapping a first end of the laminate sandwich composite structure onto a second end of the laminate sandwich composite structure: and
   fastening the first end of the laminate sandwich composite structure to the second end of the laminate sandwich composite structure;
   wherein the contiguous one-piece composite control surface skin provides a control surface on opposing sides of the trailing edge control surface and substantially distributes bending, shear and torsion loads of the trailing edge control surface to the plurality of hinge fittings and the plurality of substantially parallel ribs.

2. The method of manufacturing a trailing edge control surface of claim 1, further comprising:
   fastening at least one of the plurality of hinge fittings to a first end of at least one of the plurality of ribs.

3. The method of manufacturing a trailing edge control surface of claim 1, wherein fastening the first end of the laminate sandwich composite structure to the second end of the laminate sandwich composite structure comprises gluing the first end of the laminate sandwich composite structure to the second end of the laminate sandwich composite structure.

4. A method of manufacturing a trailing edge control surface, the method comprising:
   positioning a contiguous one-piece composite control surface skin on a substantially flat tool;
   providing fastener apertures and hinge fitting access apertures through the contiguous one-piece composite control surface skin;
   positioning a plurality of stiffener cores and a corresponding plurality of thin covering skins over each of the plurality of stiffener cores on the contiguous one-piece composite control surface skin between sections of fastener apertures;
   curing the contiguous one-piece composite control surface skin, the plurality of stiffener cores and the corresponding plurality of thin covering skins to create a laminate sandwich composite structure;
   removing the laminate sandwich composite structure from the substantially flat tool;
   folding the laminate sandwich composite structure to envelop a plurality of substantially parallel ribs and a plurality of hinge fittings;
   partially joining the laminate sandwich composite structure to the plurality of substantially parallel ribs and the plurality of hinge fittings;
   aligning the plurality of hinge fittings; and
   permanently joining the laminate sandwich composite structure to the plurality of substantially parallel ribs and the plurality of hinge fittings,
   wherein the contiguous one-piece composite control surface skin provides a control surface on opposing sides of the trailing edge control surface and substantially distributes bending, shear and torsion loads of the trailing edge control surface to the plurality of hinge fittings and the plurality of substantially parallel ribs.

5. The method of manufacturing a trailing edge control surface of claim 4, wherein partially joining the laminate sandwich composite structure to the plurality of substantially parallel ribs and the plurality of hinge fittings comprises applying sealant to at least one adjoining interface of the laminate sandwich composite structure with the plurality of substantially parallel ribs and the plurality of hinge fittings.

6. The method of manufacturing a trailing edge control surface of claim 4, wherein folding the laminate sandwich composite structure comprises providing a curved portion of the laminate sandwich composite structure at a first end of the trailing edge control surface, and a joined portion of the laminate sandwich composite structure at a second end of the trailing edge control surface, the joined portion having two oppositely disposed edges of the laminate sandwich composite structure joined to themselves.

7. The method of manufacturing a trailing edge control surface of claim 6, wherein aligning the plurality of hinge fittings further comprises providing an axis of rotation of the trailing edge control surface being located at the first end and through each of the plurality of hinge fittings.

8. The method of manufacturing a trailing edge control surface of claim 4, further comprising providing a plurality of access apertures in the laminate sandwich composite structure that provide access through the contiguous one-piece composite control surface skin to the plurality of hinge fittings.

9. The method of manufacturing a trailing edge control surface of claim 4, wherein permanently joining the laminate sandwich composite structure to the plurality of substantially parallel ribs and the plurality of hinge fittings comprises providing mechanical fasteners through the fastener and hinge fitting access apertures of the laminate sandwich composite structure into the plurality of substantially parallel ribs and the plurality of hinge fittings.

10. A method of manufacturing a trailing edge control surface, the method comprising:
   providing a contiguous one-piece composite control surface skin;
   positioning a plurality of stiffener cores on the contiguous one-piece composite control surface skin;
   positioning a corresponding plurality of thin covering skins on each of the plurality of stiffener cores to create a laminate sandwich composite structure;
   forming fastener apertures through the laminate sandwich composite structure;
   orienting a plurality of ribs to be substantially parallel with respect to each other and attaching the plurality of ribs to the laminate sandwich composite structure via the fastener apertures;
   then wrapping a first end of the laminate sandwich composite structure onto a second end of the laminate sandwich composite structure; and
   joining the first end of the laminate sandwich composite structure to the second end of the laminate sandwich composite structure.

11. The method of claim 10, further comprising, after forming fastener apertures through the laminate sandwich composite structure, curing the contiguous one-piece composite control surface skin, the plurality of stiffener cores and the corresponding plurality of thin covering skins.

12. The method of claim 10, further comprising forming hinge fitting access apertures through the laminate sandwich composite structure.

13. The method of claim 12, further comprising, prior to wrapping the first end of the laminate sandwich composite structure onto the second end of the laminate sandwich composite structure, attaching a plurality of hinge fittings to the laminate sandwich composite structure via the fastener apertures proximate the hinge fitting access apertures.

14. The method of claim 13, further comprising joining at least one of the plurality of hinge fittings to a first end of at least one of the plurality of ribs.

15. The method of claim 14, wherein joining the first end of the laminate sandwich composite structure to the second end of the laminate sandwich composite structure comprises:
   partially joining the laminate sandwich composite structure to the plurality of ribs and the plurality of hinge fittings, and subsequently permanently joining the laminate sandwich composite structure to the plurality of ribs and the plurality of hinge fittings.

16. The method of claim 15, further comprising aligning the plurality of hinge fittings after partially joining the laminate sandwich composite structure to the plurality of ribs and the plurality of hinge fittings and before permanently joining the laminate sandwich composite structure to the plurality of ribs and the plurality of hinge fittings.

17. The method of claim 15, wherein partially joining the laminate sandwich composite structure to the plurality of ribs and the plurality of hinge fittings comprises applying sealant to at least one adjoining interface of the laminate sandwich composite structure with the plurality of ribs and the plurality of hinge fittings.

18. The method of claim 15, wherein permanently joining the laminate sandwich composite structure to the plurality of ribs and the plurality of hinge fittings comprises providing mechanical fasteners through the fastener and hinge fitting access apertures of the laminate sandwich composite structure into the plurality of ribs and the plurality of hinge fittings.

19. The method of claim 10, wherein wrapping the first end of the laminate sandwich composite structure onto the second end of the laminate sandwich composite structure comprises forming a joined portion of the laminate sandwich composite structure, the joined portion having two oppositely disposed edges of the laminate sandwich composite structure joined to themselves.

20. The method of claim 10, wherein joining the first end of the laminate sandwich composite structure to the second end of the laminate sandwich composite structure comprises gluing the first end of the laminate sandwich composite structure to the second end of the laminate sandwich composite structure.

* * * * *